United States Patent
Bischoff

(10) Patent No.: US 11,138,057 B2
(45) Date of Patent: Oct. 5, 2021

(54) METHOD FOR ANALYZING A CAUSE OF AT LEAST ONE DEVIATION

(71) Applicant: Siemens Aktiengesellschaft, Munich (DE)

(72) Inventor: Martin Bischoff, Großhelfendorf (DE)

(73) Assignee: SIEMENS AKTIENGESELLSCHAFT

(*) Notice: Subject to any disclaimer, the term of this patent is extended or adjusted under 35 U.S.C. 154(b) by 170 days.

(21) Appl. No.: 16/430,562

(22) Filed: Jun. 4, 2019

(65) Prior Publication Data
US 2019/0377626 A1    Dec. 12, 2019

(30) Foreign Application Priority Data
Jun. 12, 2018 (EP) .................................. 18177160

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01)

(58) Field of Classification Search
CPC ............................ G06F 11/079; G06F 11/0751
See application file for complete search history.

(56) References Cited

U.S. PATENT DOCUMENTS

| | | | |
|---|---|---|---|
| 5,309,369 A | 5/1994 | Kamiguchi et al. | |
| 8,095,819 B2 * | 1/2012 | Watanabe | G06F 11/0709 714/4.1 |
| 8,180,724 B1 * | 5/2012 | Qureshi | G06F 11/079 706/50 |
| 9,262,255 B2 * | 2/2016 | Hampapur | G06F 11/079 |
| 9,547,543 B2 * | 1/2017 | Chen | G05B 23/0232 |

(Continued)

FOREIGN PATENT DOCUMENTS

| | | |
|---|---|---|
| DE | 69112353 T2 | 2/1996 |
| DE | 102016203676 A1 | 9/2017 |

(Continued)

OTHER PUBLICATIONS

Non-English European Search Report for Application No. 18177160. 1, dated Dec. 21, 2018.

*Primary Examiner* — Elmira Mehrmanesh
(74) *Attorney, Agent, or Firm* — Schmeiser, Olsen & Watts LLP

(57) ABSTRACT

Provided is a method and corresponding unit for analyzing a cause of at least one deviation, having the steps of: receiving a state data record which has at least one deviation; determining at least one preceding state data record; determining at least one alternative preceding state data record based on the at least one preceding state data record; determining at least one simulated data record by simulating the at least one alternative preceding state data record; comparing the at least one simulated data record with the state data record to be analyzed; determining a similarity value between the at least one simulated data record and the state data record; outputting the at least one simulated data record of the at least one alternative preceding state data record as the cause of the at least one deviation or at least one error message on the basis of the similarity value.

13 Claims, 2 Drawing Sheets

(56) References Cited

U.S. PATENT DOCUMENTS

Figure 1:
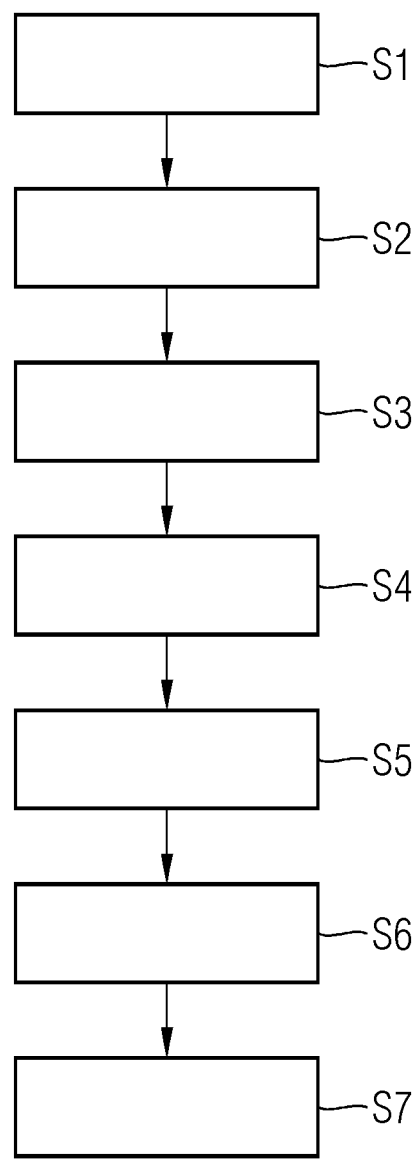

| | | | | |
|---|---|---|---|---|
| 10,248,528 B2* | 4/2019 | Wang | .................. | G06F 11/0754 |
| 10,277,693 B2* | 4/2019 | Hendrickson | ..... | G06F 16/24578 |
| 10,467,087 B2* | 11/2019 | Zarrini | .................. | G06F 11/079 |
| 10,516,857 B2* | 12/2019 | Lam | ...................... | H04N 7/185 |
| 10,592,328 B1* | 3/2020 | Thompson | .......... | G06F 11/0793 |
| 2002/0091972 A1* | 7/2002 | Harris | .................. | G06F 11/008 |
| | | | | 714/47.2 |
| 2015/0074023 A1* | 3/2015 | Gu | .......................... | G06N 3/08 |
| | | | | 706/12 |
| 2017/0017537 A1* | 1/2017 | Razin | .................... | G06N 20/00 |
| 2017/0091870 A1* | 3/2017 | Trainor | ................. | G06Q 40/08 |
| 2019/0049503 A1 | 2/2019 | Dahms et al. | | |
| 2019/0065298 A1* | 2/2019 | Leverich | .............. | G06F 11/079 |

FOREIGN PATENT DOCUMENTS

| | | |
|---|---|---|
| WO | 2006003449 A2 | 10/2006 |
| WO | 2017139046 A1 | 8/2017 |

\* cited by examiner

METHOD FOR ANALYZING A CAUSE OF AT LEAST ONE DEVIATION

CROSS-REFERENCE TO RELATED APPLICATIONS

This application claims priority to EP Application No. 18177160.1, having a filing date of Jun. 12, 2018, the entire contents of which are hereby incorporated by reference.

FIELD OF TECHNOLOGY

The following relates to a computer-implemented method for analyzing a cause of at least one deviation. The following is also directed to a corresponding autonomous unit and to a computer program product. The following can be used, in particular, in the technical fields of automation and robotics.

BACKGROUND

"Root cause analysis" is becoming increasingly important in automation and robotics. Root cause analysis is aimed at identifying and analyzing the cause of a deviation. The deviation may be, for example, an error, an exception, an abnormality, a fault, suspicious or unexpected behavior, a problem or an accident. For example, root cause analysis plays a decisive role in automation installations, such as manufacturing production installations or production lines, and robotic systems.

For example, an error may occur during an operating sequence of an industrial robot. In this case, the error may be caused by the industrial robot or by the environment. With reference to the industrial robot, a gripper on a robot arm can hold an object. The object falls down during a movement. There may be different causes of this: for example, the object collided with an obstacle during the movement, the object has lower friction and has therefore slid of out the gripper, the gripper does not hold the object at the correct position since the sensors provide incorrect data or the gripper holds the object with an excessively low force, for instance since the maximum force of the actuators of the gripper does not suffice for this.

Root cause analysis is carried out manually according to the known art. However, root cause analysis is elaborate and complex as a result. Test and maintenance approaches for facilitating the identification of the cause of an error for experts are also known. Conventional approaches are, inter alia, "logging" and "remote monitoring". Logging is the recording of system states and measurement data from the environment, for example. Remote monitoring is the external monitoring of the installation or the system, such as industrial robots.

For example, the above industrial robot can use these approaches to store the positions of each joint and the position of the gripper in space at intervals of seconds. The measurement data from the pressure sensors on the gripper are likewise stored. These data can be used to determine the force with which an object is held. In addition, a stereo camera can be mounted on the arm and can be used to film the environment, the object and the hand and to reconstruct them as three-dimensional objects in space. With such data, a good basis for root cause analysis, such as of the above dropped object, is available to the experts.

However, the known approaches are inadequate with regard to increasing automation and Industry 4.0 since they are time-consuming and error-prone and require expert knowledge. It is therefore desirable to provide an autonomous unit which independently carries out root cause analysis and can also take countermeasures.

An aspect relates to providing a method for an autonomous unit which analyzes a cause of at least one deviation in an efficient and reliable manner.

SUMMARY

The above-mentioned aspect is achieved, according to embodiments of the invention, by means of a method for analyzing a cause of at least one deviation, having the steps of:
  a. receiving a state data record which is to be analyzed and has the at least one deviation;
  b. determining at least one preceding state data record;
  c. determining at least one alternative preceding state data record on the basis of the at least one preceding state data record;
  d. determining at least one simulated data record by simulating the at least one alternative preceding state data record;
  e. comparing the at least one simulated data record with the state data record to be analyzed;
  f. determining a similarity value between the at least one simulated data record and the state data record to be analyzed; and
  g. outputting the at least one simulated data record of the at least one alternative preceding state data record as the cause of the at least one deviation and/or at least one error message on the basis of the similarity value.

The method according to embodiments of the invention is carried out by an autonomous unit. The term "autonomous" stands for standalone, self-sufficient, self-reliant and independent. An exemplary autonomous system is an autonomous vehicle. Autonomous driving should be understood as meaning the progressive movement of vehicles, mobile robots and driverless transport systems which behave in a largely autonomous manner. Further examples of an autonomous unit are robot units or other automation installation units.

The state data record comprises data relating to the autonomous unit such as the system state and/or data relating to the environment of the autonomous unit such as sensor data or camera recordings.

The state data record to be analyzed is that data record which is available at the current time. In other words, it is the current state data record. The preceding state data record is that data record which precedes or predates the state data record to be analyzed in terms of time. In other words, this is a state data record from a past time.

The autonomous unit can transmit the data records using one or more interfaces.

The state data record to be analyzed has at least one deviation. The deviation corresponds to a deviation from the expected behavior. In other words, the actual state deviates from the desired state. The actual state corresponds to the current state or to the state of the autonomous unit at the current time. The desired state corresponds to the normal state or to the expected behavior. The deviation may be, in particular, an error, an exception, an abnormality, a fault, suspicious or unexpected behavior, a problem or an accident of the autonomous unit. In contrast to this, there was not yet any deviation in the preceding state data record.

The at least one simulated data record is compared with the state data record to be analyzed and is checked for similarity. The state data records are more similar, the shorter the distance between them. The distance may be determined by means of a distance measure or a metric.

The at least one simulated data record and/or the at least one alternative preceding state data record may be output, in particular, as the cause of the at least one deviation if the similarity value is sufficiently high, in particular exceeds a predetermined limit value. Otherwise, the at least one error message can be output.

The advantage is that, in contrast to the known art, the root cause analysis is carried out independently or self-sufficiently by the autonomous unit. This makes it possible to save personnel and time. Consequently, the costs can be considerably reduced. Furthermore, the autonomous unit is advantageously less error-prone and is therefore more reliable.

Furthermore, in contrast to the known art, the autonomous unit can also determine causes of unexpected, unprecedented events.

Furthermore, as a further advantage, the autonomous unit can collect and store these data which have been obtained and can thereby build up a wealth of experience. Accordingly, the knowledge grows and the autonomous unit can be improved.

In one configuration, the at least one preceding state data record is stored in a storage unit. Accordingly, the storage unit may be in the form of a database, a cloud or another volatile or non-volatile storage unit which can be accessed efficiently and reliably. The state data records can be stored at regular intervals of time in order to improve the reliability and completeness of the state data records and the accuracy of the analysis according to embodiments of the invention.

In another configuration, the similarity value is determined on the basis of a distance metric, in particular a Euclidean distance or a Manhattan metric.

Accordingly, different distance metrics can be used. In this case, the distance metric is used to compare the data records and to determine the similarity value. This may be the Euclidean distance in the simplest case. A distance function with weights is furthermore also appropriate in order to compare different parameter types with one another in a distance function.

In another configuration, the simulation is a physical simulation.

Accordingly, physical simulations can be used. Exemplary physical simulations are acoustic, heat, rigid body, fluid, deformation, process and rigid body simulations and combinations thereof (so-called multi-domain simulations) etc. Alternatively or additionally, other metrics or simulations can be used. As a result, the metric or simulation can be advantageously flexibly adapted depending on the fields of application or other conditions.

In another configuration, the at least one alternative preceding state data record is determined by varying at least one variable.

In another configuration, the at least one variable is varied in at least one interval.

Accordingly, the variable is a parameter, a property or any other criterion. In other words, parameters are varied. For example, a multiplicity of similar gripping situations, which differ in terms of one or more variables, are generated for the exemplary gripper. The position and/or force can be varied or changed. Accordingly, the variable is the position or the force. The variable can be changed in an interval or a range.

In another configuration, the variation of the at least one variable takes into account a density distribution.

Accordingly, the parameter can be varied according to a density distribution. Therefore, gripping situations with smaller deviations are generated more frequently than gripping situations with large deviations, for example. This is advantageous since large deviations are more unlikely.

In another configuration, the method also comprises the treatment of the cause of the at least one deviation.

In another configuration, the treatment of the cause of the at least one deviation comprises
 transmitting the cause to another unit; and/or
 carrying out a measure.

In another configuration, the cause is transmitted in the form of a message or a notification.

In another configuration, the measure is an adaptation or a setting.

Accordingly, the method according to embodiments of the invention is carried out by an autonomous unit. In addition to determining the cause of an error, the autonomous unit can also treat the determined or identified cause in order to eliminate the error. The autonomous unit can carry out one or more steps at the same time or in succession for this purpose. Furthermore, the autonomous unit can also proceed gradually. It can transmit the cause to another unit such as a terminal, a control unit or another computing unit which takes a corresponding measure. Alternatively or additionally, the autonomous unit can also initiate a corresponding measure itself, rather than by means of another unit. As a result, the error can be advantageously eliminated in an efficient and reliable manner without the need for a further component.

An aspect also relates to an autonomous unit for carrying out the above method.

An aspect also relates to a computer program product (non-transitory computer readable storage medium having instructions, which when executed by a processor, perform actions) having a computer program which has means for carrying out the method described above when the computer program is executed on a program-controlled device.

A computer program product, for example a computer program means, can be provided or delivered, for example, as a storage medium, for example a memory card, a USB stick, a CD-ROM, a DVD, or else in the form of a downloadable file from a server in a network. This can be carried out, for example in a wireless communication network, by transmitting a corresponding file containing the computer program product or the computer program means. A possible program-controlled device is, in particular, a control device, for example an industrial control PC or a programmable logic controller, PLC for short, or a microprocessor for a smartcard or the like.

BRIEF DESCRIPTION

Figure 2:
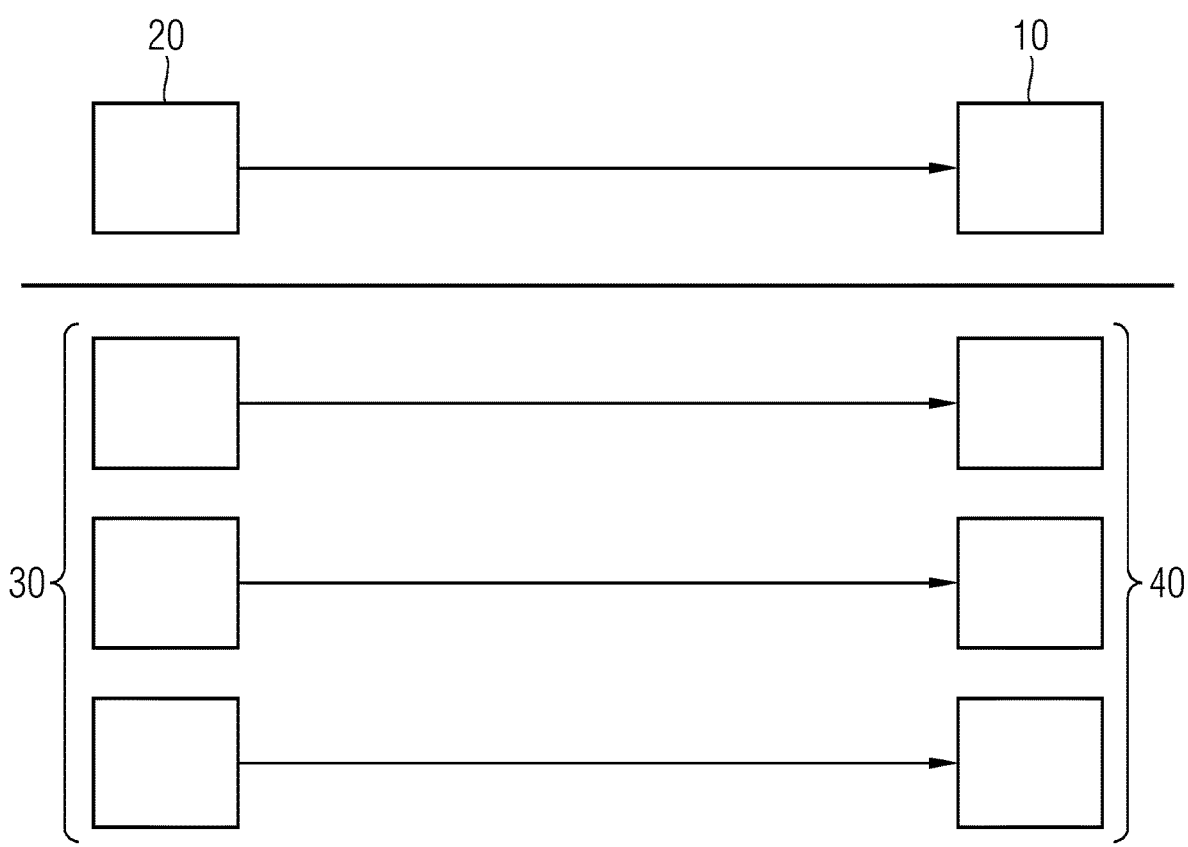

Some of the embodiments will be described in detail, with reference to the following figures, wherein like designations denote like members, wherein:

FIG. 1 shows a schematic flowchart of the method according to embodiments of the invention; and FIG. 2 shows the different state data records according to one embodiment of the invention.

DETAILED DESCRIPTION

Exemplary embodiments of the present invention are described below with reference to the figures.

FIG. 1 schematically illustrates a flowchart of the method according to embodiments of the invention having the method steps S1 to S7. The method is applied to the state data record 10 to be analyzed in order to analyze the cause of its deviation.

According to FIG. 1, the past situation is reconstructed in a step S2. For this purpose, a preceding state data record 20 from a past time, at which there was as yet no error, is retrieved. For example, a robotic system, as an autonomous unit, uses a stereo camera and pressure sensors to detect that an object has slipped from a gripper and has fallen onto the ground. The robotic system begins with the cause analysis by loading a preceding state data record for which the object was held in a stable manner by the gripper.

Parameters are varied in a further step S3. The state data may be subject to measurement errors, may be inaccurate and may possibly even be incorrect themselves. Therefore, it is possible for the cause of the error to already be hidden in the recorded state data and to have not been detected by the autonomous unit. The preceding state data 20 are varied at predefined intervals and in predefined density distributions. This generates a variety of alternative preceding state data records 30 which are very similar to the preceding state data record 20 but are different in terms of details.

Referring to the above example, a multiplicity of similar gripping situations which all differ in terms of details according to predefined parameter variations are generated. For example, the gripper is at a slightly different position in space, the object is in a somewhat different orientation in the gripper, the gripper encloses the object with different forces, possible obstacles in space are stored at somewhat different positions than in the original state data record.

In a further step S4, on the basis of each individual alternative preceding state data record 30 generated, a simulation is carried out until the current time at which the deviation was detected. In this case, depending on the field of application, use is made of dedicated computing operations which describe how the system state evolves from time to time. Consequently, the system states simulated until the current time are determined as simulated data records 40. In this case, different simulations can be selected depending on the field of application.

For example, the mechanical forces, in particular, are decisive for the gripper. Accordingly, a physical simulation has proved to be particularly advantageous. For each artificially generated gripping situation, the gripper movement is simulated according to the control signals and the physical laws until the time of the deviation. In another example, for instance an autonomous power plant controller, the laws of mechanics are less relevant. Therefore, the process sequence from one system state to the next can be described by control logics and chemical and/or thermodynamic processes.

In a further step S5, the simulated data records 40 are compared with the state data record 10 to be analyzed. The state(s) having the same deviation as the state data record 10 to be analyzed may possibly be investigated more closely again, for example by means of further detailed parameter variations. That simulated data record which is most similar to the state data record 10 to be analyzed is determined from the simulated data records 40. Furthermore, the alternative preceding state data record from which the simulated data record emerges is also known.

For example, the gripper has likewise dropped the object in some simulated data. A simulation is distinguished, for example, by the fact that the object fell from the hand or came to rest at the same point on the ground at the same time for the same control signal. The corresponding alternative preceding state data record with which this simulation started differs from the state data record to be analyzed from the past, in particular, by virtue of the fact that the object had a somewhat different orientation.

In a further step, the cause of an error can be inferred by considering the differences between the alternative preceding state data records and the preceding state data record.

In other words, the alternative preceding state data records can be concomitantly taken into account when comparing the simulated data with the state data record to be analyzed. The greater the deviation of an alternative preceding state from the state data record to be analyzed, the more unlikely it is that the alternative preceding state data record was the actual past state.

For example, the alternative preceding state data record differs from the preceding state data record by virtue of the orientation. In this case, it is obvious that the object was actually grasped by the gripper as described in the alternative preceding state data record and not as assumed in the preceding state data record. Consequently, self-tests of the sensors can be carried out, for example. Alternatively or additionally, further preceding state data records further in the past can also be investigated in order to determine whether the object was picked up incorrectly or already slid in the gripper during a previous movement.

The autonomous unit can take different measures on the basis of the results obtained in order to treat the cause of the deviation, for example: can independently eliminate the deviation, can alert a person or another unit, can reprogram itself in order to prevent such deviations in future, for instance can monitor more frequently, or can grip differently and/or can classify the deviation as harmless since the cause is now known and can be accordingly categorized.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for analyzing a cause of at least one deviation in an autonomous unit, having the steps of:
   a. receiving a state data record which is to be analyzed, wherein the state data record includes data related to the autonomous unit and has the at least one deviation;
   b. determining at least one preceding state data record;
   c. determining a plurality of alternative preceding state data records on the basis of the at least one preceding state data record;
   d. determining a plurality of simulated data records by simulating a state of the autonomous unit up to a present time starting from each alternative preceding state data record of the plurality of alternative preceding state data records;
   e. comparing each of the plurality of simulated data records with the state data record to be analyzed;
   f. determining a similarity value between each of the plurality of simulated data records of the plurality of simulated data records and the state data record to be analyzed; and
   g. outputting a respective simulated data record which is most similar to the state data record to be analyzed as the cause of the at least one deviation or at least one error message on the basis of the similarity value.

2. The method as claimed in claim 1, wherein the at least one preceding state data record is stored in a storage unit.

3. The method as claimed in claim 1, wherein the similarity value is determined on the basis of a distance metric, wherein said distance metric is a Euclidean distance or a Manhattan metric.

4. The method as claimed in claim 1, wherein the simulation is a physical simulation.

5. The method as claimed in claim 1, wherein the plurality of alternative preceding state data records are determined by varying at least one variable.

6. The method as claimed in claim 5, wherein the at least one variable is varied in at least one interval.

7. The method as claimed in claim 6, wherein the variation of the at least one variable takes into account a density distribution.

8. The method as claimed in claim 1, also comprising the treatment of the cause of the at least one deviation.

9. The method as claimed in claim 8, wherein the treatment of the cause of the at least one deviation comprises
transmitting the cause to another unit; and/or
carrying out a measure.

10. The method as claimed in claim 9, wherein the cause is transmitted in the form of a message or a notification.

11. The method as claimed in claim 9, wherein the measure is an adaptation or a setting.

12. An autonomous unit for carrying out a method for analyzing a cause of at least one deviation, having the steps of:
   a. receiving a state data record which is to be analyzed, wherein the state data record includes data related to the autonomous unit and has the at least one deviation;
   b. determining at least one preceding state data record;
   c. determining a plurality of alternative preceding state data records on the basis of the at least one preceding state data record;
   d. determining a plurality of simulated data records by simulating a state of the autonomous unit up to a present time starting from each alternative preceding state data record of the plurality of alternative preceding state data records;
   e. comparing each of the plurality of simulated data records with the state data record to be analyzed;
   f. determining a similarity value between each of the plurality of simulated data records of the plurality of simulated data records and the state data record to be analyzed; and
   g. outputting a respective simulated data record which is most similar to the state data record to be analyzed as the cause of the at least one deviation or at least one error message on the basis of the similarity value.

13. A computer program product, comprising a non-transitory computer readable hardware storage device having computer readable program code stored therein, said program code executable by a processor of a computer system to implement a method for analyzing a cause of at least one deviation, having the steps of:
   a. receiving a state data record which is to be analyzed, wherein the state data record includes data related to the autonomous unit and has the at least one deviation;
   b. determining at least one preceding state data record;
   c. determining a plurality of alternative preceding state data records on the basis of the at least one preceding state data record;
   d. determining a plurality of simulated data records by simulating a state of the autonomous unit up to a present time starting from each alternative preceding state data record of the plurality of alternative preceding state data records;
   e. comparing each of the plurality of simulated data records with the state data record to be analyzed;
   f. determining a similarity value between each of the plurality of simulated data records of the plurality of simulated data records and the state data record to be analyzed; and
   g. outputting a respective simulated data record which is most similar to the state data record to be analyzed as the cause of the at least one deviation or at least one error message on the basis of the similarity value.

* * * * *